United States Patent

Halfmann

[15] 3,651,273

[45] Mar. 21, 1972

[54] CIRCUIT ARRANGEMENT FOR COUPLING, HOLDING AND RELEASING OF CROSSPOINT RELAYS IN A CONNECTION PATH IN TELECOMMUNICATION SYSTEMS

[72] Inventor: Heinrich Halfmann, Korntal, Germany

[73] Assignee: International Standard Electric Corporation, New York, N.Y.

[22] Filed: Oct. 13, 1969

[21] Appl. No.: 865,833

[30] Foreign Application Priority Data

Oct. 16, 1968 Germany ......................P 18 03 220.7

[52] U.S. Cl. ..........................................................179/18 GE

[51] Int. Cl. ..........................................................H04q 3/495

[58] Field of Search ..............................................179/18 GE

[56] References Cited

UNITED STATES PATENTS

| | | | |
|---|---|---|---|
| 3,546,387 | 12/1970 | Strunk | 179/18 GE |
| 3,489,854 | 1/1970 | Buchner | 179/18 GE X |

*Primary Examiner*—Kathleen H. Claffy

*Assistant Examiner*—Thomas W. Brown

*Attorney*—C. Cornell Remsen, Jr., Walter J. Baum, Percy P. Lantzy, J. Warren Whitesel, Delbert P. Warner, James B. Raden and Marvin M. Chaban

[57] ABSTRACT

A marking and holding circuit for cross-point relays in a plural stage communications switching network. In each stage, the winding of the cross-point relay is held through an individual hold path including its own contacts. The holding potential in successive stages is connected in a back-to-back arrangement to allow selected relays in successive stages to be seized in multiple to complete a path through the network. In the path, the selected relay in each stage is held individually through its own cross-point contacts.

9 Claims, 3 Drawing Figures

PATENTED MAR 21 1972 3,651,273

Figure 1A:
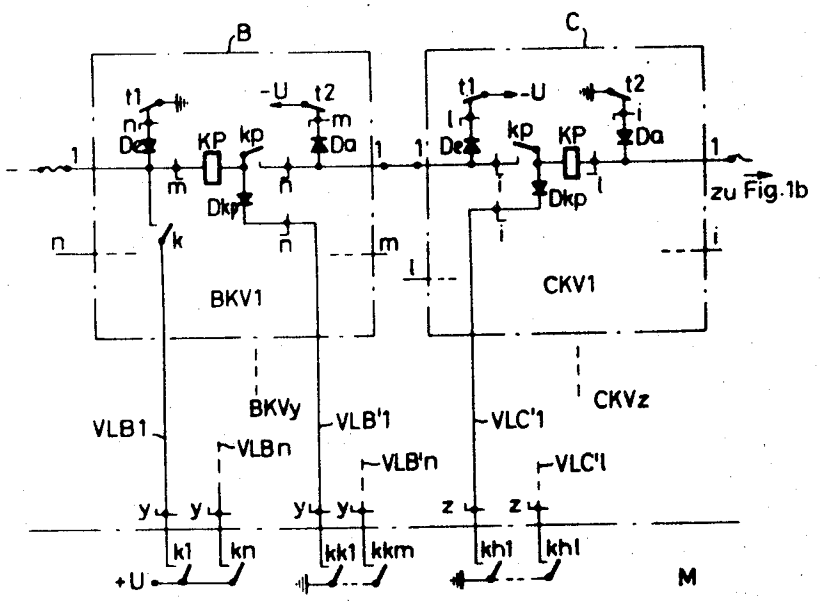

CIRCUIT ARRANGEMENT FOR COUPLING, HOLDING AND RELEASING OF CROSSPOINT RELAYS IN A CONNECTION PATH IN TELECOMMUNICATION SYSTEMS

This invention relates to a circuit arrangement for the coupling, holding and releasing of cross-point relays in a connection path leading through a number of connecting stages in a cross-point network with links, in which path the windings of the cross-point relays are each connected in series with an associated holding contact and are multiple-connected on the input and output sides according to the structure of the cross-point multiples, the windings of the cross-point relays being directly selectable via marking circuits whilst the cross-point relays are releasable by breaking the holding circuit.

In most known telephone systems in which the cross-point networks have a number of connecting stages in series the coupling, holding and releasing of a connection path series of cross-point relays from one connection stage to the next are carried out in sequence. These known systems have an individually associated holding relay for each link or so-called link relays. Apart from the resulting extra cost in the cross-point network, this series method requires considerable time for the establishment of a path, since the times for coupling and holding the cross-point relays in the various connecting stages cumulate.

A parallel method is thus required for cross-point networks having a number of connecting stages in series, in which method each step of coupling, holding and releasing of the cross-point relays in a path can be effected for the entire path.

The German published application No. 1,086,284 (DAS) reveals a circuit arrangement for the coupling, holding and releasing of cross-point relays in a connecting path in a telephone system, which path leads through a number of connecting stages in a cross-point network with links and in which path the windings of the cross-point relays are each connected in series with an individually associated holding contact and are multipled on the input and output sides according to the structure of the cross-point multiples, the windings of the cross-point relays being directly selectable via marking lines, while the cross-point relays are releasable by breading the holding circuit. The cross-point relays in all of the connecting stages, as required for the path, can be simultaneously excited via the marking lines per connecting stage. The holding contacts of the excited cross-point relays close a holding circuit which leads through all of the connecting stages and includes, per stage, the winding of the cross-point relay and the holding contact associated therewith. This holding circuit also includes the link relays necessary for selection. This known arrangement requires an independent marking voltage source per connecting stage, and the enlargement of the cross-point network via further connecting stages calls for matching up in the holding circuit running through all of the connecting stages.

It is an object of the invention to improve a circuit arrangement for the coupling, holding and releasing of cross-point relays in a connecting path leading through a number of connecting stages in a cross-point network with links, in which path the windings of the cross-point relays are each connected in series with an individually associated holding contact and are multipled on the input and output sides according to the structure of the cross-point multiples, the windings of the cross-point relays being directly selectable via marking lines, while the cross-point relays are releasable by breaking the holding circuit, in telecommunication systems and more particularly telephone systems, such that irrespective of the number of connecting stages there are in the cross-point network only one marking voltage source and one holding voltage source is necessary and the holding conditions for the cross-point relay remain constant. It is desired to eliminate the holding relays per link and link relays and to make it possible to use the circuit arrangement for a variety of path-finding processes, such as path finding via a through-connected wire or path finding in the central control unit. According to the invention, a circuit arrangement of this kind is characterized in that there is fed a holding potential or a holding counter-potential to each input and each output of all of the cross-point multiples of all connecting stages independently, that the individual holding circuits connected to the links connecting two connecting stages together each carry the same potential and alternate between holding potential and holding counter-potential from connecting stage to connecting stage, and that the individual input and output holding circuits associated with each cross-point multiple are combined together and can be switched out of circuit via contacts of a cutoff relay. These holding circuits within each connecting stage make the coupling and holding of the cross-point relays independent of the number of series-connected connecting stages. Since the marking voltage source and the holding voltage source have the same counter-potential, marking of the cross-point relays in all connecting stages can be effected by a single marking voltage source and holding of the cross-point relays in all connecting stages can be effected with a single holding voltage source. Additional switching means, such as link relays or holding relays associated with each link, are not necessary, since the distribution of the holding circuits to the inputs and outputs of a cross-point multiple provides a holding circuit which will only be broken when the holding circuits on the same link in the adjacent connecting stage are also broken. This is only the case for that cross-point relay which is included in the path to be cleared. Thus clearing can be effected by simple selection and excitation of the cutoff relays in the cross-point multiples included in the path.

The marking and holding circuits may be of particularly simple design and mutually decoupled, even though the order in the series connection comprising the winding and the holding contact of the cross-point relay is reversed from one connecting stage to the next. The holding circuits at the inputs and outputs of the cross-point multiple may then be combined, decoupled by diodes, and broken by an associated contact of the cutoff relay associated with each cross-point multiple.

According to one embodiment of the new circuit arrangement the voltages are such that the marking potential has a different polarity from the holding potential, that the holding counter-potential corresponds to the marking counter-potential and that an additional decoupling diode is included in the marking circuit. The feed to the cross-point relay is such that the holding counter-potential and the marking potential can be fed to one terminal of the winding of the cross-point relay, while the other terminal of the said winding may receive the marking counter-potential via the decoupling diode and the holding potential via the holding contact of the cross-point relay.

The reversal of the order of the winding and holding contact of the cross-point relay from connecting stage to connecting stage also has the advantage that the links connected at each end to the cross-point relay windings in the adjacent connecting stages may receive the marking potential for both of these connecting stages via one marking line. This reduces the cost of connecting means in the marking circuits. According to the invention the cost of marking circuits is kept low by making it possible to feed the marking potential simultaneously to all of the inputs of equal ordinal number in all of the cross-point multiples in a connecting stage and to connect the marking line to the required input in the selected cross-point multiple by means of the contact of a switching device. Thus the number of marking circuits is equal to the number of inputs or outputs of one cross-point multiple in the selected connecting stage.

The cross-point network of the invention may also include concentration or expansion arrangements. To ensure that the coincidence-type or coordinate-type selection is maintained, provision is made that at inputs or outputs of a cross-point multiple to which a number of links are connected, the links of the adjacent connecting stage carry no holding potential or holding counter-potential and that at the particular input or output of the cross-point multiple the holding potential or the holding counternpotential can be fed either via the holding circuit within the cross-point multiple or via a holding circuit characterizing the input or output and controlled by the central control unit. In this way the required coincidence-type or coordinate-type control is made possible directly at the branching points in the cross-point network.

Figure 1B:
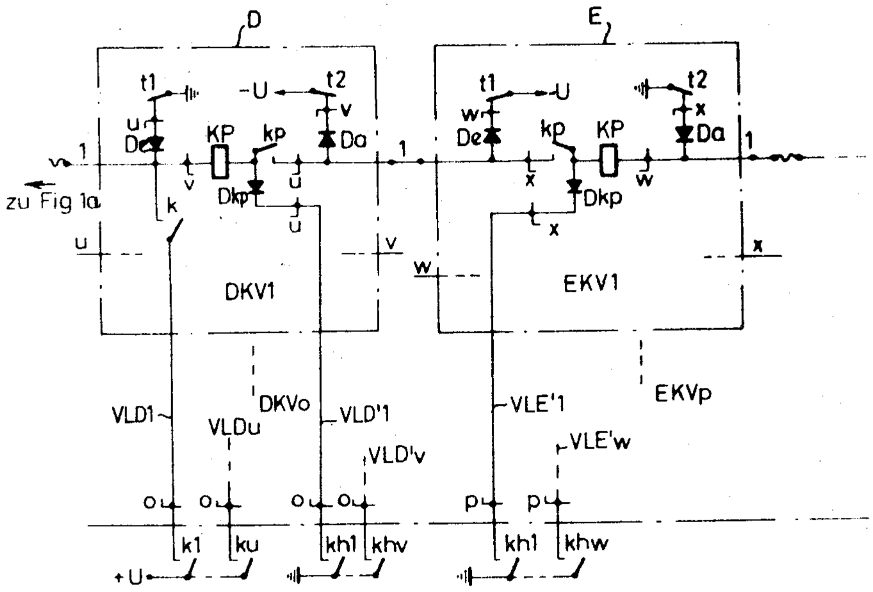
Figure 2:
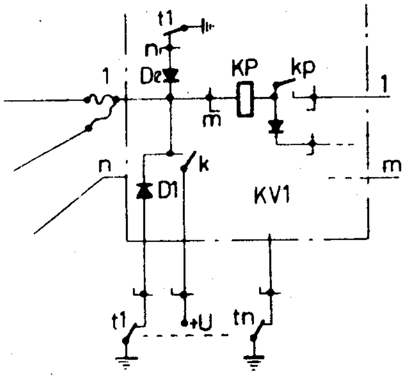

The invention is further described with reference to an embodiment illustrated in the accompanying drawings, in which:

FIGS. 1*a* and 1*b* show the marking and holding circuits of paired connecting stages of a network of a path extending via four connecting stages with links, and FIG. 2 shows the holding circuit for the cross-point relay of a connecting stage.

FIGS. 1*a* and 1*b* each show two connecting stages of a four-stage cross-point network in which only the marking and holding circuits are outlined. The method of path finding is of no importance in connection with the circuit arrangement of the invention. It is merely necessary for the cross-point multiples which are contained in the four connecting stages and are involved in the path are noted in the central control unit M for the purposes of setting up and clearing the path.

The present embodiment embraces, in its connecting stage B, *y* cross-point multiples BKV*l* to BKV*y* each having *n* inputs and *m* outputs. The connecting stage C, which includes *z* cross-point multiples CKV*l* to CKV*y*, is connected to the connecting stage B via links. The cross-point multiples of the connecting stage C have *l* inputs and *i* outputs. In the connection stage D there are provided *o* cross-point multiples DKV*l* to DKV*o* each having *u* inputs and *v* outputs, while the connecting stage E includes *p* cross-point multiples EKV*l* to EKV*p* each having *w* inputs and *x* outputs.

Each input 1 to *n* of the connecting stage B leads to *m* cross-point relays KP which can connect this input to the m outputs of the cross-point multiple BKV1 according to the speech network. All *n* inputs of the cross-point multiple are combined via decoupling diodes De and connected to the holding counter-potential 'earth' via the contact t1 of the cutoff relay of this cross-point multiple BKV1. Thus the output sides of the series connections comprising the windings KP and the holding contacts *kp* are connected in multiple with the outputs 1 to *m* of the cross-point multiple BKV1 such that the *n* contacts of the cross-point relays KP are connected to each of the *m* outputs, which relays lead to the inputs 1 to *n*. The outputs 1 to *m* of a cross-point multiple are also combined via decoupling diodes D*a* and connected to holding potential -U via the contact 2 of the cutoff relay in this cross-point multiple BKV1.

The marking circuits start at the central control unit M. The inputs 1 to *n* of the cross-point multiple BKV1 may be selected via the contacts *k*1 to *kn*. As indicated by the multiple arrow designated by *y*, the inputs of like ordinal number in all cross-point multiples BKV1 to BKV*y* are connected in a multiple and only in the selected cross-point multiple is the marking circuit connected through to the cross-point relay KP via the contact *k* of a switching device. The number of marking lines VLB1 to VLB*n* is equal to the number *n* of inputs in a cross-point multiple of the connecting stage B.

The marking counter-potential 'earth' is connected via the contacts *kh*1 to *khm* to all of the outputs of like ordinal number in all of the cross-point multiples in the selected connecting stage B. As indicated by the multiple arrow n at these marking lines, the marking counter-potential earth is connected via decoupling diodes D*kp* to each of the *n* cross-points combined at one of the outputs 1 to *m*.

Much the same applies to the connecting stages C, D and E, the number of inputs l, *u* and *v* and the number of outputs *i*, *v* and *x* being fixed per cross-point multiple CKV1 of CKV1*z*, DKV1 to DKV*o* and EKV1 to EKV*p*. The cross-point multiples and the holding and marking circuits are designed accordingly. The reference letters on the multiple arrows provide information on the design. The control contacts in the central control unit are marked accordingly. For the 1 inputs of a cross-point multiple in the connecting stage C and contacts *kh*1 to *khl* are sufficient, while for the connecting stage D the contacts *k*1 to *ku* and *kh*1 to *khv* are necessary. The connecting stage E may, finally, be marked via the contacts *kh*1 to *khw*.

With he present arrangement it is important that each link in adjacent connecting stages meets with the same potential conditions in the holding circuits disposed within the cross-point multiples. The links which connect the connecting stage B to the connecting stage C receive, like the links connecting the connecting stage D to the connecting stage E, the holding potential —U at each end, while the links connecting the connecting stages C and D receive, like the inputs of the connecting stage B and the outputs of the connecting stage A or E respectively, the holding counter-potential 'earth'.

This alternation in potential from link to link leads to a type of coincidence or coordinate selection on clearing the path, as may be easily shown. If, for example, the cross-point relay KP shown in the connecting stage D and the cross-point relay shown in the connection stage E are included in a path, clearing of the path will involve the selection and excitation of the cutoff relays in the cross-point multiples DKV1 and EKV1. The contacts *t*1 and *t*2 in the two cross-point multiples open and only thus will the link connecting the two cross-point relays become free of potential. Thus in a selected cross-point multiple the cross-point relay can only be released when cross-point multiples involved in the path in the adjacent connecting stages are also selected and the associated holding circuits are opened.

As may also be seen from the embodiment the order of the windings KP and holding contacts *kp* is reversed from one connecting stage to the next. In this way the marking circuits may be simplified. The marking potential +U can also be utilized, via the contacts *k*1 to *ku* and the cross-point multiples DKV1 to DKV*o*, for marking in the cross-point multiples CKV1 to CKV*z*. A marking circuit then includes one cross-point relay each in the connecting stages C and D, both cross-point multiples being fixed by the actuated contact *k* in the cross-point multiple DKV1, the marking contact *k*1 to *ku* and the link between the connecting stages C and D. The input of the cross-point multiple CKV1 is determined by the actuated marking contact *kh*1 to *khl*.

The connection of the connecting stages to each other requires no further description in this specification. When the system is operating at full capacity, the $m\cdot y$ outputs of the connecting stage B are connected to the $l\cdot z$ inputs of the connecting stage C, and the $i\cdot z$ outputs of the connecting stage C are connected to the $u\cdot o$ inputs of the connecting stage D, and the $o\cdot v$ outputs of the connecting stage D are connected to the $w\cdot p$ inputs inputs of the connecting stage E. Thus the $n\cdot y$ inputs of the connecting stage B can be connected to the $x\cdot p$ outputs of the connecting stage E via the four-stage cross-point network.

Finally, the establishment, holding and clearing of a path through the four-stage cross-point network shown will now be described. For the sake of simplicity it will be assumed that this path passes through the four cross-point multiples shown, in each case via the input and output with the ordinal number 1. For marking purposes the cross-point multiples BKV1, CKV1, DKV1 and EKV1 are selected. In the cross-point multiples BKV1 and DKV1 the switching means associated with each of these cross-point multiples responds so as to close the contact *k*. In the central control unit M the marking contacts *k*1 and *kh*1 for all connecting stages are closed, because, as has already been mentioned, the path is to run through the inputs and outputs bearing the ordinal number 1.

In the four connecting stages B, C, D and E the four marking circuits for the cross-point relays KP shown become effective simultaneously, these circuits being as follows:

1. +U, *k*1, VLB1, *k*, KP, D*kp*, VLB'1, *kk*1, earth;
2. +U, *k*1, VLD1, *k*, KP, D*kp*, VLC'1, *kh*1, earth;
3. +U, *k*1, VLD1, *k*, KP, D*kp*, VLD'1, *kh*1, earth;
4. +U at the output 1 of the connecting stage E, KP, D*kp*, VLE'1, *kh*1, earth.

The cross-point relays KP respond simultaneously and close the contacts *kp*, which makes the holding circuits effective. The diodes D*e* and D*a* prevent the marking potential +U from becoming ineffective due to the holding counter-potential 'earth', while the diodes D*kp* and D*a* decouple the marking counter-potential 'earth' and the holding potential –U from each other. When the marking voltage is switched off the cross-point relays KP hold via the holding circuits contained within each cross-point multiple. It will be readily appreciated that the circuit arrangement may be designed for any desired number of connecting stages without the conditions in the marking or holding circuits of a cross-point relay of any connecting stage being influenced.

To clear or release the path the cutoff relays in the cross-point multiples BKV1, CKV1, DKV1 and EKV1 involved are selected and excited. If all of the contacts *t*1 and *t*2 in the cross-point multiples shown are open, the cross-point relays will be released. If, for example, a second cross-point relay in the cross-point multiple DKV1 in the connecting stage D is involved in another path, this second cross-point relay may not be released together with the present cross-point relay on clearance of the present path being described. This is ensured in that, in spite of the holding potential –U and the holding counter-potential 'earth' being switched off in the cross-point multiple DKV1, the relevant cross-point relay will again receive holding counter-potential from the connecting stage C and holding potential from the connecting stage E via the links to the adjacent connecting stages C and E and the relevant cross-point multiples involved in that second path.

Furthermore, certain measures ensure that no two paths pass through the same two successive cross-point multiples of two adjacent connecting stages. This is achieved by the regular distribution and wiring of the links. Only one link leads from a cross-point multiple in one connecting stage to a cross-point multiple in the following and previous connecting stages.

Thus to clear a path it is sufficient to know the cross-point multiples involved. If, however, there is a concentrated or expanded mixture between two connecting stages, that is, if a number of links are connected to any one input or output of a cross-point multiple, the feed-in of the holding potentials of holding counter-potentials must be effected at that point at which the concentration or expansion commences, as shown in FIG. 2.

If, for example, a number of links are connected to the inlet 1 of a cross-point multiple KV1, the clearance of these links may only be controlled from the input of the cross-point multiple. In this case the holding counter-potential 'earth' may not be passed to the link from the previous connecting stage (not shown), as a number of links branch out at the input 1 of the cross-point multiple KV1. Thus the holding counter-potential 'earth' is provided either via the holding circuit individually associated with the cross-point multiple or via a holding circuit derived from the central control unit and characterizing the multipled inputs of the cross-point multiple of the connecting stage. The outputs of the cross-point multiple KV1 can again be wired in the ration 1:1 so that the arrangement there may be as in FIG. 1.

The cross-point multiples to be selected in establishing and clearing a path are determined by an identifying operation in the path-finding network according to the particular path-finding method, or they are read out from connection stores. The establishment and clearance of the paths occurs one at a time.

Since no clearance direction is laid down as in holding circuits passing through a number of connecting stages, the holding circuits can be arranged in pairs as mirror images of each other. This allows for favorable selection and excitation of the cross-point relay. In this way the cost of connecting means in the marking circuits is reduced.

The individual holding circuits in each connecting stage are also less sensitive to accidental grounding on the links with respect to the destruction and risk of burning of the cross-point relays.

I claim:

1. In a telephone system, a circuit arrangement for the coupling, holding and releasing of cross-point relays in a connecting path leading through a number of connecting stages in a cross-point network with links, in which path the windings of the cross-point relays are each connected in series with an associated holding contact are multipled on the input and output sides according to the structure of the cross-point multiples, the windings of the cross-point relays being directly selectable via marking circuits, while the cross-point relays are releasable by breaking the holding circuit, characterized in that there is fed a holding potential or a holding counter-potential to each input and each output of all of the cross-point multiples of all connecting stages independently, that the individual holding circuits connected to the links connecting two connecting stages together each carry the same potential and alternate between holding potential and holding counter-potential from connecting stage to connecting stage, and that the individual input and output holding circuits associated with each cross-point multiple are combined together and can be switched out of circuit via cutoff means.

2. A circuit arrangement as claimed in claim 1, characterized in that the order of the winding and of the holding contact of the cross-point relay is changed in the series connection thereof from connecting stage to connecting stage.

3. A circuit arrangement as claimed in claim 1, characterized in that the input and output holding circuits of each cross-point multiple are decoupled from each other by diodes.

4. A circuit arrangement as claimed in claim 1, characterized in that said marking circuits apply marking potential and marking counter-potential, and wherein the holding potential has a different polarity from the marking potential, that the holding counter-potential is the same as the marking counter-potential, and that an additional decoupling diode is included in each of the marking circuits.

5. A circuit arrangement as claimed in claim 4, characterized in that there are means for feeding the holding counter-potential and the marking potential to one terminal of the winding of each selected cross-point relay, and for feeding the other terminal of the winding of the cross-point relay.

6. A circuit arrangement as claimed in claim 1, characterized in that the marking potential is connected to links which are connected to the winding of each selected cross-point relay, only in one of the two connecting stages involved.

7. A circuit arrangement as claimed in claim 6, characterized in that the marking potential is simultaneously fed to all of the inputs of like ordinal number in all of the cross-point multiples in a connecting stage and that the marking line may be connected through to the required input in the selected cross-point multiple via a contact of a switching device.

8. A circuit arrangement as claimed in claim 6, characterized in that the number of marking circuits for the marking potential and marking counter-potential is equal to the number of inputs or outputs of a cross-point multiple in the selected connecting stage.

9. A circuit arrangement as claimed in claim 1, characterized in that at inputs or outputs of a cross-point multiple to which a number of links are connected, the links of the adjacent connecting stage carry no holding potential or holding counter-potential and that at the particular input or output of the cross-point multiple the holding potential or the holding counter-potential can be fed either via the holding circuit within the cross-point multiple or via a holding circuit characterizing the input or output and controlled by a central control unit.

* * * * *